(12) United States Patent
Gaschler et al.

(10) Patent No.: US 7,375,148 B2
(45) Date of Patent: May 20, 2008

(54) METHOD FOR PRODUCING AQUEOUS STYRENE-BUTADIENE-IV POLYMER DISPERSIONS

(75) Inventors: Wolfgang Gaschler, Heidelberg (DE); Volker Schaedler, Mannheim (DE); Lambertus Manders, Ludwigshafen (DE); Thomas Wirth, Freinsheim (DE); Hubertus Kroener, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 261 days.

(21) Appl. No.: 10/491,279

(22) PCT Filed: Sep. 30, 2002

(86) PCT No.: PCT/EP02/10969

§ 371 (c)(1),
(2), (4) Date: Mar. 31, 2004

(87) PCT Pub. No.: WO03/029316

PCT Pub. Date: Apr. 10, 2003

(65) Prior Publication Data

US 2004/0242766 A1     Dec. 2, 2004

(30) Foreign Application Priority Data

Oct. 1, 2001    (DE) ................. 101 48 511

(51) Int. Cl.
C08F 2/38     (2006.01)
C08F 2/22     (2006.01)

(52) U.S. Cl. ................. 523/201; 524/804; 526/81; 526/85

(58) Field of Classification Search ............. 523/201; 526/81
See application file for complete search history.

(56) References Cited

U.S. PATENT DOCUMENTS

| 5,284,908 | A | * | 2/1994 | Fujiwara et al. | ............ 524/718 |
| 5,703,157 | A | | 12/1997 | Fujiwara et al. | |
| 7,060,762 | B2 | * | 6/2006 | Schaedler et al. | ............ 526/87 |
| 2004/0242767 | A1 | * | 12/2004 | Gaschler et al. | ............ 524/804 |

FOREIGN PATENT DOCUMENTS

| DE | 195 12 999 | 10/1995 |
| DE | 100 46 930 | 4/2002 |
| EP | 0 016 403 | 10/1980 |
| EP | 0 407 059 | 1/1991 |
| EP | 0 666 274 | 8/1995 |

\* cited by examiner

*Primary Examiner*—Tae H Yoon
(74) *Attorney, Agent, or Firm*—Oblon, Spivak, McClelland, Maier & Neustadt, P.C.

(57) ABSTRACT

A process for preparing an aqueous styrene-butadiene polymer dispersion by free-radical aqueous emulsion polymerization of a monomer mixture M comprising styrene, butadiene, and if desired up to 30% by weight, based on 100% by weight of monomers, of ethylenically unsaturated comonomers other than styrene and butadiene; in a polymerization vessel by a monomer feed technique in the presence of a regulator system containing, based on 100% by weight of monomers, from 0.02 to 0.5% by weight of at least one hydrocarbon HC having from 6 to 20 carbon atoms, selected from compounds which on abstraction of a hydrogen atom form a pentadienyl radical or 1-phenylallyl radical, and α-methylstyrene dimer, and from 0.3 to 2% by weight of an organic compound S containing at least one SH group wherein at least 30%, preferably at least 50%, in particular at least 80%, and with particular preference the entirety (or >95%) of hydrocarbon HC is included in the initial charge to the polymerization vessel.

18 Claims, No Drawings

METHOD FOR PRODUCING AQUEOUS STYRENE-BUTADIENE-IV POLYMER DISPERSIONS

The present invention relates to a process for preparing an aqueous styrene-butadiene polymer dispersion by free-radical aqueous emulsion polymerization of a monomer mixture containing styrene and butadiene by a monomer feed technique. The invention also relates to the styrene-butadiene polymer dispersions obtainable by this process and to their use as binders in colored paper coating slips.

Paper and cardboard are frequently enhanced in their printability and their optical properties such as gloss, whiteness, and opacity in the course of their production with a pigmented coating. The coating compositions used in this context, also referred to as colored paper coating slips, comprise in addition to the pigment a binder whose purpose is to anchor the individual pigment particles to one another and to the surface of the paper and so to form a continuous pigment layer.

Those papers and cardboards which are coated are, in particular, graphics paper and cardboard intended for printing. Coating is also carried out on specialty papers such as labels, wallpapers, and unprinted silicone papers which are used as backings for self-adhesive labels.

Although the binder content of the paper coating compositions is generally only up to 30 parts by weight per 100 parts by weight of pigment, it has a critical influence on the properties of the paper, especially the print performance and the appearance. Examples of important print performance parameters include smoothness, absence of blisters, compressibility, and absorbency for liquids, such as printing inks or fountain solution, for example. Another important criterion is the stability of the coating to mechanical stresses. High mechanical stability must be ensured in offset printing in particular, since owing to the tack of the printing inks used the surface is subjected to very high mechanical stress. Because of the fountain solution used in offset printing, this mechanical strength must also be ensured in the wet state. The mechanical load-bearing capacity of the paper coating is also known as the pick resistance, and the mechanical load-bearing capacity in the wet state as the wet pick resistance.

The pick resistance of paper coatings is becoming increasingly important owing to the fact that the print speeds, which have risen sharply in recent years, are placing an increasing mechanical load on the paper surface. Because of this, the aqueous polymer dispersions used in the prior art as binders are being employed in increasingly greater weight fractions in the coating. One consequence of this, however, is an unwanted increase in the cost of the material inputs for paper coating. Moreover, the increased binder fraction is adversely affecting the optical properties and the printability of the paper. For instance, the increased binder fraction leads to a retarded absorption behavior for the printing ink, one of whose possible consequences is the offsetting of the printing ink within the stack.

EP-A 407 059 describes a process for preparing butadiene copolymer latices having a gel fraction of at least 5% in the presence of chain transfer agents. The chain transfer agents specified include mixtures of terpene carbons and sulfur-containing chain transfer agents. The latices described therein may be used as binders in paper coating compositions.

DE 195 12 999 discloses paper coating compositions whose binder comprises a multiphase styrene-butadiene copolymer latex whose addition polymer has two glass transition points that differ from one another by at least 5 K. The preparation takes place in general by emulsion polymerization of the constituent monomers in the presence of chain transfer agents. The chain transfer agents used include alkyl mercaptans and hydrocarbons such as terpinolene or α-methylstyrene dimer. The preparation of multiphase polymers, however, is associated with an additional complexity.

German patent application P 100 46 930.2 describes the preparation of substantially single-phase styrene-butadiene latices, by emulsion polymerization in the presence of a mixture of sulfur compound and terpinolene regulators (chain transfer agents), the regulator being supplied to the polymerization reaction in the course of that reaction.

The butadiene-styrene latices described in the prior art are frequently unable to meet the pick resistance requirements, especially the wet pick resistance requirements, to the desired extent. The prior art's proposed use of terpinolene as a polymerization regulator leads to products which are likewise unsatisfactory, under the conditions specified in that art.

Moreover, the residual monomer content is unsatisfactory in some cases.

It is an object of the present invention to provide a polymer latex which is easy to prepare and which, used even in small amounts in paper coating compositions, results in paper coatings possessing high dry and wet pick resistance.

We have found that this object is achieved, surprisingly, by a styrene-butadiene polymer latex prepared by free-radical aqueous emulsion polymerization of a styrene and butadiene monomer mixture by a monomer feed technique in the presence of a regulator system containing, based on 100% by weight of monomers, from 0.02 to 0.5% by weight of at least one hydrocarbon HC having from 6 to 20 carbon atoms, selected from compounds which on abstraction of a hydrogen atom form a pentadienyl radical or 1-phenylallyl radical, and α-methylstyrene dimer, and from 0.3 to 2% by weight of an organic compound S containing at least one SH group wherein at least 30%, preferably at least 50%, in particular at least 80%, and with particular preference the entirety (or >95%) of hydrocarbon HC is included in the initial charge to the polymerization vessel.

The present invention accordingly provides a process for preparing an aqueous styrene-butadiene polymer dispersion by free-radical aqueous emulsion polymerization of a monomer mixture M comprising styrene,
butadiene, and if desired
up to 30% by weight, based on 100% by weight of monomers M, of ethylenically unsaturated comonomers other than styrene and butadiene;

by a monomer feed technique, which comprises supplying the above-described regulator system in the manner described above.

The organic compound S may in principle be included in the initial charge to the polymerization vessel. Preferably, however, the majority, in particular at least 70%, with particular preference at least 90%, and especially the entirety of the organic compound S is supplied to the polymerization reaction in the course of that reaction. The addition of the majority of the compound S and especially the entirety of the compound S takes place preferably in parallel to the monomer addition, in particular in the monomer feed stream.

The polymer dispersions obtainable by the process are notable for a low coagulum fraction, high mechanical stability, and a low residual monomer content. Using these dispersions, moreover, it is possible to prepare paper coating compositions which even with low proportions of binder are superior to the prior art paper coating compositions with regard to pick resistance, especially wet pick resistance. Accordingly, the polymer dispersions obtainable by the process of the invention are likewise provided by the present invention.

The regulator system of the invention contains preferably from 0.05 to 0.4% by weight and in particular from 0.1 to 0.3% by weight of at least one hydrocarbon HC and preferably from 0.5 to 1.8% by weight and in particular from 0.7 to 1.5% by weight of at least one organic compound S containing at least one SH group. In general, the weight ratio of terpinolene to compounds S is at least 1:100, preferably at least 1:50, and in particular at least 1:10. It is at most 1:1.25, in particular at most 1:1.5, and with particular preference at most 1:2.

Preferred compounds S are soluble in the hydrophobic monomers styrene and butadiene. They are selected in particular from $C_4$-$C_{18}$-alkyl mercaptans such as n-hexyl mercaptan, n-octyl mercaptan, tert-octyl mercaptan, n-decyl mercaptan, n-dodecyl mercaptan, tert-dodecyl mercaptan, n-hexadecyl mercaptan, and stearyl mercaptan.

Suitable hydrocarbons HC besides the α-methylstyrene dimer are all those compounds which on abstraction of a hydrogen atom form a pentadienyl or 1-phenylallyl radical. These are compounds which contain either a 1,4-pentadiene structure with one or two hydrogen atoms on the C3 atom (strucrure A):

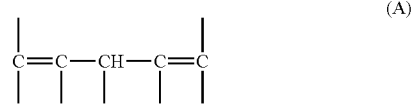

(A)

or a 1,3-pentadiene structure having one or two hydrogen atoms on the C5 atom (structure B)

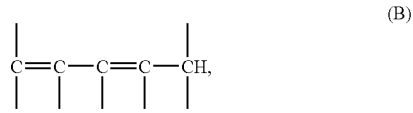

(B)

in which one of the double bonds may also be part of a phenyl ring. In structures A and B, the vertical lines indicate open valences, but without stating the stereochemistry of the double bonds. The open valences can be satisfied by hydrogen, an alkyl group or a phenyl group, or pairs of open valences may form a 5- or 6-membered carbocyclic ring. Valences on two carbon atoms joined to one another by a double bond may combine with the carbon atoms of the double bond to form a phenyl ring.

Examples of compounds with the structure A are 1,4-dihydrobenzene, γ-terpinene, terpinolene and norbornadiene and also α-ionone. Examples of hydrocarbons with the structure B are 1,3-cyclohexadiene, α-terpinene, and α-phellandrene. The term "hydrocarbon HC" also embraces hydrocarbon ketones and hydrocarbon alcohols which eliminate water to form a structure A or B. Preferred hydrocarbon regulators are γ-terpinene, terpinolene and α-methylstyrene dimer, especially terpinolene.

The term "monomer feed technique" is in common use in the prior art and in contradistinction to the term "batch technique" refers to a polymerization technique in which the monomers to be polymerized are not included fully in the initial charge to the reaction vessel but in which, instead, the majority, normally at least 70%, preferably at least 80%, and in particular at least 90% or the entirety of the total monomers to be polymerized, are supplied to the polymerization reaction over a defined time period, under polymerization conditions. Polymerization conditions to the skilled worker mean that the polymerization reactor contains an amount of initiator sufficient to initiate the polymerization reaction and the contents of the reactor are at a temperature at which the initiator exhibits a decomposition rate sufficient to initiate the polymerization. The relationships between temperature and decomposition rate are sufficiently well known to the skilled worker for the common polymerization initiators or can be determined in routine experiments.

Concentration figures in monomer feeds, hereinbelow, unless otherwise specified, relate to the instantaneous concentration of one component in the feed at the point in time at which it is added. Figures on monomer concentrations in percent by weight refer to the entirety of the monomers supplied at the point in time in question or within the time interval in question. By contrast, gross indications relate to the entirety of a component which is added over the entire duration of a feed. Unless otherwise specified, a reference to the monomer feed is to be understood as a reference to the sum of all the monomer feed streams.

In order to reduce the amount of residual volatiles it has proven advantageous to supply the monomers to the polymerization reaction as rapidly as possible. The monomers to be polymerized are preferably supplied to the polymerization reaction within a period of not more than 8 hours, in particular within from 2 to 6 hours, with particular preference within from 2.5 to 5 hours.

In one preferred embodiment of the invention, at a point in time when at lest 70% of the monomers to be polymerized have been supplied to the polymerization reaction, the concentration of butadiene in the monomer feed will be raised for a period of at least 1% of the total feed duration by at least 10% by weight, preferably by at least 15% by weight, e.g., by from 10 to 40% by weight, and in particular by from 15 to 30% by weight, based on monomers in the feed.

In general, the time interval in which the monomer feed has an increased butadiene concentration is at least 1% and in particular at least 2% of the total duration of the monomer feed and will preferably not exceed a duration of 20%, in particular 10%, and will be, for example, from 1 to 20%, in particular from 2 to 20%, of the total duration of the monomer feed.

The concentration of butadiene in the monomer feed is preferably raised to at least 50% by weight, in particular to at least 55% by weight. Accordingly, the styrene concentration during this period will be preferably not more than 50% by weight and with particular preference not more than 45% by weight.

The change in composition of the feed takes place preferably when at least 75%, and in particular at least 80%, and preferably before 99%, in particular before 95%, and with particular preference before 90%, of the monomers to be polymerized have been supplied to the polymerization reaction.

The change in composition in the monomer feed may take place continuously or in stages in one or more steps, e.g., in 2, 3, 4, 5 or 6 steps, to an end value or within a limited time interval which ends before the end of the addition of monomer.

The change in composition of the monomer feed may be controlled in a variety of ways. For example, butadiene and styrene can be supplied to the polymerization reaction by way of separate monomer feed streams. Alternatively, a portion of one kind of monomer, e.g., a portion of butadiene, is supplied to the polymerization reaction by way of a feed stream which is separate from the remainder of the monomers. By changing the relative feed rate of the monomer feed streams it is then possible in a simple way to bring about a change in the gross composition of the monomer feed. Of course, the monomers M1 and M2 and also, where appropriate, M3 can also be supplied to the polymerization reaction by way of a common feed stream and the instantaneous composition of the feed stream can be preadjusted by means of suitable mixing devices which permit continuous mixing of fluid streams. Static mixers are particularly suitable here.

In one preferred embodiment, A, toward the end of the addition of monomer the supply rate of the styrene-containing monomer feed is reduced, with the rate of butadiene supply constant, preferably such that the fraction of styrene in the monomer feed at the point in time of the end of addition of monomer is less than 40% by weight, in particular less than 20% by weight, and especially 0% by weight. The change is preferably made when 80%, in particular from 90 to 99.5%, and with particular preference from 95 to 99% of the monomers have been supplied. A particularly simple way of achieving this is by ending the supply of styrene before the supply of butadiene has been ended, in particular when from 90 to 99.5% by weight, and with particular preference from 95 to 99% by weight, of the total butadiene to be polymerized have been supplied.

Conversely, with the rate of styrene addition constant, it is possible toward the end of the addition of monomer to raise the rate of butadiene supply to a final value or at least to do so within a limited time interval (embodiment B). Additionally, the two measures can be combined with another. As far as the duration of the phase of increased butadiene supply rate is concerned, the remarks made above apply.

Particular preference is given, as a special form of embodiment B, to an embodiment B' in which a monomer mixture comprising styrene and butadiene, and monomers M3 if desired, in an approximately constant monomer composition is supplied to the polymerization reaction as monomer feed Mf1, the fraction of butadiene in the gross composition of Mf1 being reduced by from 0.5 to 20% by weight, based on the total amount of butadiene in the monomer composition to be polymerized. When at least 70%, preferably from 75 to 99%, and in particular from 80 to 95% of the monomer feed Mf1 have been supplied to the polymerization reaction, from 0.5 to 20% by weight, preferably from 1 to 10% by weight, and in particular from 2 to 5% by weight of butadiene, based on the total amount of the butadiene to be polymerized overall, are added as a feed Mf2 in parallel with the remainder of the monomer feed Mf1 to the polymerization reaction. Feed Mf2 will preferably contain less than 5% by weight of non-butadiene monomers M2 and/or M3. In particular, feed Mf2 contains butadiene as the sole monomer. Mf2 can be added beginning at the abovementioned point in time through to the end of the polymerization reaction, or within a short interval. The total duration of feed Mf2 is preferably from 1 to 20% and in particular from 2 to 10% of the total duration of Mf1. The feeds Mf1 and Mf2 are to be understood as mass flows. Mf1 and Mf2 can be introduced into the polymerization reactor by way of separate inlets. It is likewise possible to introduce the amounts of monomer corresponding to the mass flows Mf1 and Mf2 into the reactor by means of a common feed line, using appropriate mixing equipment.

The monomers may be added either in the form of a mixture of the monomers as such or else in the form of an aqueous emulsion of the monomers M1 to M3, the latter procedure generally being preferred. In embodiment B' the butadiene-rich feed Mf2 is frequently supplied to the polymerization reaction as pure monomer or monomer mixture and the feed Mf1 as an aqueous emulsion.

Where the monomers are supplied to the polymerization reaction as an aqueous emulsion, the monomer fraction is usually from 30 to 90% by weight, in particular from 40 to 80% by weight, of the total weight of the emulsion. In addition, the monomer emulsion generally includes at least part, preferably at least 70% by weight, in particular at least 80% by weight, or the entirety, of the surface-active compounds which are normally required for an emulsion polymerization.

Even when the monomer composition is changed in the manner described, no multiplicity of phases occurs in the resultant polymers, such as would be manifested, for example, in a plurality of glass transition temperatures in the DSC of the polymer.

Suitable initiator systems for the process of the invention include in principle those which are known for free-radical aqueous emulsion polymerization. Preferred initiators are soluble in water. Particular preference is given to those initiators which contain a peroxide group, such as organic and inorganic peroxides and hydroperoxides. Particularly preferred are hydrogen peroxide and the salts of peroxodisulfuric acid, e.g., sodium peroxodisulfate. Also suitable are organic hydroperoxides such as tert-butyl hydroperoxide and cumene hydroperoxide. In some cases it has been found appropriate to use the aforementioned peroxides together with a reducing agent and/or a metal compound which is able to change its valence state.

Typical reducing agents are ascorbic acid, hydroxymethanesulfinic acid, the bisulfite adduct of acetone, sodium sulfite or sodium hydrogen sulfite. Examples of suitable metal compounds are the salts and water-soluble complexes of iron, of vanadium or of copper. The free-radical initiator is customarily used in an amount of from 0.1 to 3% by weight, based on the monomers to be polymerized.

The temperature of polymerization depends of course on the decomposition characteristics of the polymerization initiator and is preferably at least 60° C., in particular at least 70° C., with particular preference at least 80° C., and with very particular preference at least 90° C. Normally, the polymerization temperature will not exceed 120° C., and preferably not 110° C., in order to avoid expensive pressure apparatus.

In order to achieve a low residual monomer content it has proven advantageous to subject the reaction mixture to intensive mixing during the polymerization. Intensive mixing can be achieved, for example, by using special stirrers in conjunction with high stirring speeds, by combining stirrers with stators or by rapid circulation, e.g., pumped circulation, of the reaction mixture via a bypass, it being possible for the bypass in turn to be equipped with devices for generating shearing forces, e.g., solid internals such as shearing plates or perforated plates. By special stirrers are meant those stirrers which generate not only a tangential flow component but also an axial flow field. Stirrers of this kind are described, for example, in DE-A 197 11 022. Multistage stirrers are particularly preferred. Examples of special stirrers for producing tangential and axial flow components are cross-arm stirrers, MIG® and INTERMIG® stirrers (multistage impulse countercurrent stirrers and interference multistage impulse countercurrent stirrers from EKATO), axial-flow turbine stirrers, it being possible for the aforementioned stirrers to be single-stage or multistage in construction and to be combined with conventional stirrers, and, additionally, helical stirrers, preferably in close-clearance versions, coaxial stirrers, comprising an anchor-shaped close-clearance stirrer and a single-stage or multistage high-speed central stirrer, and also multiple-blade stirrers. Also suitable are the types of stirrer described in DE-C1 4421949, JP-A 292002 and WO 93/22350.

In general, the free-radical aqueous emulsion polymerization is carried out in the presence of surface-active compounds. By surface-active compounds are meant both emulsifiers and protective colloids, which unlike the emulsifiers generally have a molecular weight of more than 2 000 daltons and which are soluble in water. The surface-active substances may be supplied together with the monomers, in the form for example of an aqueous monomer emulsion. It is of course also possible to include some or all of the surface-active substances in the initial charge to the polymerization vessel.

Preferred emulsifiers are anionic and nonionic emulsifiers, which are generally used in amounts of from 0.2 to 10% by weight, preferably from 0.5 to 5% by weight, based on the polymer in the dispersion or on the monomers M to be polymerized.

The anionic emulsifiers include alkali metal salts and ammonium salts of alkyl sulfates (alkyl: $C_8$-$C_{20}$), of sulfuric monoesters with ethoxylated alkanols (EO units: 2 to 50, alkyl: $C_8$ to $C_{20}$) and ethoxylated alkylphenols (EO units: 3 to 50, alkyl: $C_4$-$C_{20}$), of alkylsulfonic acids (alkyl: $C_8$ to $C_{20}$) and of alkylarylsulfonic acids (alkyl: $C_4$-$C_{20}$). Further suitable anionic emulsifiers are given in Houben-Weyl, Methoden der organischen Chemie, Volume XIV/1, Makromolekulare Stoffe, Georg-Thieme-Verlag, Stuttgart, 1961, pp. 192-208.

The anionic surface-active substances also include compounds of the formula I

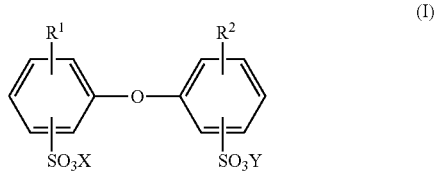

(I)

where $R^1$ and $R^2$ are hydrogen or linear or branched alkyl radicals having from 6 to 18 carbon atoms and in particular having 6, 12 or 16 carbon atoms, $R^1$ and $R^2$ not both being hydrogen at the same time. X and Y are preferably sodium, potassium or ammonium, with sodium being particularly preferred. Use is frequently made of technical-grade mixtures containing from 50 to 90% by weight of the monoalkylated product, an example being Dowfax® 2A1 (trade mark of Dow Chemical Company). The compounds I are common knowledge, for example, from U.S. Pat. No. 4,269,749.

Suitable nonionic emulsifiers are araliphatic or aliphatic nonionic emulsifiers, examples including ethoxylated mono-, di- and trialkyl phenols (EO units: 3 to 50, alkyl: $C_4$-$C_9$), ethoxylates of long-chain alcohols (EO units: 3 to 50, alkyl: $C_8$-$C_{36}$), and polyethylene oxide/polypropylene oxide block copolymers. Preference is given to ethoxylates of long-chain alkanols (alkyl: $C_{10}$-$C_{22}$, average degree of ethoxylation: from 3 to 50) and, of these, particular preference to those based on oxo alcohols and naturally occurring alcohols having a linear or branched $C_{12}$-$C_{18}$ alkyl radical and a degree of ethoxylation of from 8 to 50.

In the process of the invention it is preferred to use anionic emulsifiers or combinations of at least one anionic and one nonionic emulsifier.

Examples of suitable protective colloids are polyvinyl alcohols, starch derivatives and cellulose derivatives, carboxyl-containing polymers such as homopolymers and copolymers of acrylic acid and/or of methacrylic acid with comonomers such as styrene, olefins or hydroxyalkyl esters, or vinylpyrrolidone homopolymers and copolymers. A lengthy description of further suitable protective colloids is given in Houben-Weyl, Methoden der organischen Chemie, Volume XIV/1, Makromolekulare Stoffe, Georg-Thieme-Verlag, Stuttgart 1961, pp. 411-420. Mixtures of emulsifiers and/or protective colloids can also be used.

With a view to the use of the products as binders in paper coating compositions, the monomer mixtures to be polymerized contain, in addition to from 20 to 80% by weight, in particular from 40 to 70% by weight, of styrene and from 20 to 80% by weight, in particular from 30 to 55% by weight, of butadiene, up to 30% by weight, preferably up to 20% by weight and in particular up to 10% by weight, e.g., from 0.5 to 20% by weight or from 1 to 10% by weight of ethylenically unsaturated comonomers other than styrene and butadiene. Examples of comonomers are:

monoethylenically unsaturated, acid-functional monomers such as monocarboxylic and dicarboxylic acids having from 3 to 10 carbon atoms such as acrylic acid, methacrylic acid, crotonic acid, acrylamido glycolic acid, vinylacetic acid, maleic acid, itaconic acid, and the monoesters of maleic acid with $C_1$-$C_4$ alkanols, ethylenically unsaturated sulfonic acids such as vinylsulfonic acid, allylsulfonic acid, styrenesulfonic acid, 2-acrylamidomethylpropanesulfonic acid, and ethylenically unsaturated phosphonic acids, e.g., vinylphosphonic acid, allylphosphonic acid, styrenephosphonic acid, and 2-acrylamido-2-methylpropanephosphonic acid and the water-soluble salts thereof, such as their alkali metal salts, preferably acrylic acid and methacrylic acid. Monomers of this kind may be present among the monomers M in an amount of up to 10% by weight, e.g., from 0.1 to 10% by weight, preferably from 0.1 to 4% by weight;

amides of monoethylenically unsaturated carboxylic acids, such as acrylamide and methacrylamide, and also the N-(hydroxy-$C_1$-$C_4$-alkyl)amides, preferably the N-methylolamides of ethylenically unsaturated carboxylic acids, such as N-methylolacrylamide and N-methylolmethacrylamide. Monomers of this kind may be present among the monomers M in an amount of up to 10% by weight, e.g., from 0.1 to 10% by weight, preferably from 0.1 to 4% by weight;

hydroxyalkyl esters of monoethylenically unsaturated carboxylic acids, especially hydroxyethyl, hydroxypropyl, and hydroxybutyl esters, e.g., hydroxyethyl acrylate, hydroxypropyl acrylate, hydroxyethyl methacrylate, and hydroxypropyl methacrylate. Monomers of this kind may be present among the monomers M in an amount of up to 10% by weight, e.g., from 0.1 to 10% by weight, preferably from 0.5 to 5% by weight;

ethylenically unsaturated nitriles having preferably from 3 to 10 carbon atoms, such as acrylonitrile and methacrylonitrile. Monomers of this kind may be present among the monomers M in an amount of up to 30% by weight, e.g., from 1 to 30% by weight, preferably from 5 to 20% by weight;

reactive monomers: the reactive monomers include those which have a reactive functionality which is suitable for crosslinking. In addition to the abovementioned ethylenically unsaturated carboxylic acids, their N-alkylolamides, and hydroxyalkyl esters, they include monomers which contain a carbonyl group or an epoxy group, examples being N-diacetoneacrylamide, N-diacetonemethacrylamide, acetylacetoxyethyl acrylate, and acetylacetoxyethyl methacrylate, glycidyl acrylate, and glycidyl methacrylate. Monomers of this kind may be present among the monomers M in an amount of up to 10% by weight, e.g., from 0.5 to 10% by weight;

and crosslinking monomers: the crosslinking monomers include those which have at least two nonconjugated ethylenically unsaturated bonds, e.g., the di- and triacrylates and -methacrylates of difunctional and trifunctional alcohols, e.g., ethylene glycol diacrylate, diethylene glycol diacrylate, triethylene glycol diacrylate, butanediol diacrylate, hexanediol diacrylate, trimethylolpropane triacrylate, and tripropylene glycol diacrylate. Monomers of this kind may be present among the monomers M in an amount of up to 2% by weight, preferably not more than 1% by weight, e.g., from 0.01 to 2% by weight, preferably from 0.01 to 1% by weight. In one preferred embodiment the monomers M contain no crosslinking monomer.

Preferred comonomers are the monoethylenically unsaturated monocarboxylic and dicarboxylic acids having from 3 to 10 carbon atoms, their amides, their $C_2$-$C_4$ hydroxyalkyl esters, their N-(hydroxy-$C_1$-$C_4$-alkyl)amides, and the aforementioned ethylenically unsaturated nitriles. Particularly preferred comonomers are the monoethylenically unsaturated monocarboxylic and dicarboxylic acids, especially acrylic acid, methacrylic acid, and itaconic acid.

In one particularly preferred embodiment the mixture of monomers M to be polymerized contains from 40 to 70% by weight of styrene,
from 30 to 59% by weight of butadiene, and
from 1 to 10% by weight of an ethylenically unsaturated monocarboxylic or dicarboxylic acid.

In another preferred embodiment, some of the styrene, preferably from 5 to 20% by weight, based on the total monomer amount, is replaced by acrylonitrile and/or methacrylonitrile. In this preferred embodiment the mixture to be polymerized contains, for example, from 30 to 65% by weight of styrene,
from 30 to 59% by weight of butadiene,
from 5 to 20% by weight of acrylonitrile and/or methacrylonitrile, and
from 1 to 10% by weight of an ethylenically unsaturated monocarboxylic or dicarboxylic acid.

With a view to the use of the products as binders in colored paper coating slips, it has proven advantageous if the polymer resulting from the polymerization has a glass transition temperature in the range from −20 to +50° C. and preferably in the range from 0 to 30° C. The glass transition temperature here is the midpoint temperature, which can be determined in accordance with ASTM 3418-82 by means of DSC.

The glass transition temperature can be controlled in a known way through the monomer mixture M employed.

According to Fox (T. G. Fox, Bull. Am. Phys. Soc. (Ser. II) 1, 123 [1956] and Ullmanns Encyklopädie der Technischen Chemie, Weinheim (1980), pp. 17 and 18) the glass transition temperature of copolymers at high molar masses is given in good approximation by $$\frac{1}{T_g} = \frac{X^1}{T_g^1} + \frac{X^2}{T_g^2} + \ldots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the polymers constructed in each case from only one of the monomers $1, 2, \ldots, n$, in degrees Kelvin. These temperatures are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989. Accordingly, polystyrene possesses a $T_g$ of 380 K and polybutadiene a $T_g$ of 171 K or 166 K.

The polymers obtainable by the process of the invention generally have a weight-average particle diameter of less than 1000 nm. The $d_w$ of the particle size is defined as usual as the weight average of the particle size, as determined by means of an analytical ultracentrifuge in accordance with the method of W. Scholtan and H. Lange, Kolloid-Z. and Z. Polymere 250 (1972) pages 782 to 796. The ultracentrifuge measurement yields the integral mass distribution of the particle diameter of a sample. From this it is possible to infer what percentage by weight of the particles has a diameter equal to or less than a certain size. With regard to the use, in accordance with the invention, in papercoating compositions, the weight-average particle diameter is preferably less than 500 nm, in particular less than 300 nm, and with particular preference in the range from 50 to 300 nm, and with very particular preference in the range from 70 to 200 nm.

Methods of adjusting the particle size of an aqueous polymer dispersion are known from the prior art. For setting a defined polymer particle size, the emulsion polymerization is preferably conducted by the seed latex process or in the presence of a seed latex prepared in situ. Techniques for doing this are known and can be found in the prior art (see EP-B 40419 and "Encyclopedia of Polymer Science and Technology", Vol. 5, John Wiley & Sons Inc., New York 1966, p. 847).

In general it proves advantageous to conduct the emulsion polymerization in the presence of one or more very finely divided polymers in the form of aqueous latices (known as seed latices).

It is preferred to use from 0.1 to 5% by weight and in particular from 0.2 to 3% by weight of at least one seed latex (solids content of the seed latex, based on total monomer amount). Some or all of the seed latex may be supplied to the polymerization reaction together with the monomers. Preferably, however, the process takes place with seed latex included in the initial charge (initial-charge seed). The latex generally has a weight-average particle size of from 10 to 200 nm, preferably from 20 to 100 nm, in particular from 20 to 50 nm. Examples of its constituent monomers include styrene, methyl methacrylate, n-butyl acrylate, and mixtures thereof, it being possible as well for the seed latex to contain in copolymerized form, to a minor extent, ethylenically unsaturated carboxylic acids, e.g., acrylic acid and/or methacrylic acid and/or their amides, preferably at less than 10% by weight, based on the total weight of the polymer particles in the seed latex.

When using a seed latex a procedure often followed is to include all or some of the seed latex, preferably at least 80% of it, in the initial charge to the polymerization vessel, to add some of the initiator, preferably in the fractions indicated above, and also, where appropriate, some of the monomers to be polymerized, and to heat the mixture to the desired polymerization temperature. It is of course also possible to introduce the initiator and the seed latex in the opposite order. The monomer is preferably not added until polymerization conditions prevail. As well as the initiator and the seed latex, the initial charge normally includes water and, where appropriate, a portion of the surface-active compounds.

In general, a pH of 9 will not be exceeded during the polymerization. The pH is controlled in a simple way by adding a neutralizing agent in the course of the polymerization reaction. Suitable examples include bases such as alkali metal hydroxide, carbonate or hydrogen carbonate, if the pH rises during the polymerization. This is the case, for example, when using peroxodisulfates as polymerization initiators.

The polymerization reaction is frequently followed by a postpolymerization for the purpose of reducing the amount of unreacted monomers in the dispersion (referred to as residual monomers). This postpolymerization is often also termed a chemical deodorization. Chemical deoderization generally takes place by free-radical postpolymerization, especially under the action of redox initiator systems, such as are listed, for example, in DE-A 44 35 423, DE-A 44 19 518 and DE-A 44 35 422. The postpolymerization is preferably conducted with a redox initiator system composed of at least one organic peroxide and a reducing agent, preferably an inorganic sulfite or the salt of an $\alpha$-hydroxy sulfone or an $\alpha$-hydroxy sulfinic acid (adduct of hydrogen sulfite with carbonyl compound). The amounts of initiator for the postpolymerization are situated generally within the range from 0.1 to 5% by weight, preferably in the range from 0.2 to 3% by weight, and in particular in the range from 0.3 to 2% by weight, based on the total monomers polymerized. In the case of initiator systems composed of a plurality of components, such as the redox initiator systems, the amounts relate to the total amount of these components. The chemical deoderization is conducted preferably at temperatures in the range from 60 to 100° C. and in particular in the range from 70 to 95° C. The quantity of initiator used for chemical deoderization may be added to the dispersion in one portion or continuously over a prolonged period at a constant or varying—e.g. increasing—feed rate. The duration of addition is then generally in the range from 10 minutes to 5 hours and in particular in the range from 30 minutes to 4 hours. The total duration of the chemical postpolymerization is generally in the range from 15 minutes to 5 hours and preferably in the range from 30 minutes to 4 hours.

The polymer dispersions obtainable by the process of the invention are distinguished by good mechanical stabilities and by comparatively low residual monomer contents. Colored paper coating slips based on these dispersions exhibit very good adhesion to paper and improved wet pick resistances. The present invention also provides colored paper coating slips comprising at least one styrene-butadiene copolymer in the form of one of the aqueous polymer dispersions of the invention.

Naturally, the principal constituent of the colored paper coating slips is at least one organic or inorganic pigment. Examples of inorganic pigments include clay minerals such as kaolin, barium sulfate, titanium dioxide, calcium carbonate, satin white, talc, aluminum hydroxide, zinc oxide, and the like. Examples of organic pigments include polystyrene latices and also urea-formaldehyde resins, preferably likewise used in the form of an aqueous dispersion. One inventively preferred embodiment of the colored paper coating slips comprises a clay mineral pigment, preferably kaolin, and calcium carbonate pigment.

The amount of binder in the colored paper coating slips of the invention is generally from 3 to 30 and preferably from 5 to 20 parts by weight per 100 parts by weight of pigment. The colored paper coating slips of the invention further contain in general from 0.1 to 5 parts by weight and preferably from 1 to 3 parts by weight of auxiliaries per 100 parts by weight of pigment. These auxiliaries include water resistance improvers, dispersing assistants for the pigments, viscosity modifiers, hardeners, color pigments, fluorescent dyes, pH modifiers, and cobinders.

The cobinders generally comprise water-soluble polymers such as casein, modified casein, starch, modified starch, polyvinyl alcohol, carboxymethylcellulose, polyacrylic acids, and the like. The cobinder fraction will generally not exceed 1 part by weight per 100 parts by weight of pigment.

As pH modifiers it is common to use bases, preferably inorganic bases such as sodium hydroxide, potassium hydroxide or calcium hydroxide. The colored paper coating slip preferably has a pH in the range from 7.5 to 9.5.

The colored paper coating slips of the invention are prepared in a customary manner by mixing of the components, preferably by addition of an aqueous polymer dispersion as obtainable by the process of the invention to an aqueous suspension of the pigment, which in general already contains some or all of the required auxiliaries.

The colored paper coating slips of the invention lead to coatings which have improved pick resistance, especially improved wet pick resistance.

The examples which follow are intended to illustrate the invention without restricting it.

The polymer particle size was determined by light scattering in accordance with ISO 13321 using a Malvern Autosizer 2C on samples with a concentration of 0.01% by weight. The light transmittance was determined on samples with a concentration of 0.01% by weight, at a path length of 2.5 cm, against pure water as the reference. The glass transition temperature was determined by means of DSC by the midpoint method.

Residual Volatiles Were Determined by Gas Chromatography.

I. Preparation of the Polymer Dispersions (Inventive Example 1 and Comparative Examples C1 and C2)

EXAMPLE 1

Dispersion D1

A polymerization vessel was charged with 300 g of water, 37 g of a 33% by weight polymer seed ($d_{50}$ 30 nm), 3.7 g of terpinolene, and 10% of the initiator solution (feed stream 2), and this initial charge was heated to 85° C.

Then the monomer emulsion and the remainder of the initiator solution were added by way of two separate feeds, beginning simultaneously, the additions to the polymerization vessel taking place over the course of 4.5 h, during which the temperature was maintained. 4 hours after beginning the feeds, 30 g of butadiene were added to the reaction vessel over the course of 5 minutes. After the end of the addition of monomer, the mixture was cooled to 70° C. and then, beginning simultaneously, an aqueous solution of 4 g of tert-butyl hydroperoxide in 70 g of water, and also a solution of 2.5 g of acetone and 7 g of a 40% strength by weight aqueous sodium disulfite solution in 67 g of water were introduced over the course of 2 hours, during which the temperature was maintained. Then 60 g of a 25% strength by weight aqueous sodium hydroxide solution were added and the batch was cooled to room temperature.

Feed Stream 1:

| 970 g | deionized water |
| 24 g | sodium lauryl sulfate solution (28% by weight in water) |
| 15 g | n-dodecyl mercaptan |
| 800 g | styrene |
| 630 g | butadiene |
| 45 g | acrylic acid |

Feed Stream 2:

| 15 g | sodium peroxodisulfate in 210 g water |

The solids content of the dispersion was about 50% by weight. The light transmittance was 48%. The weight-average particle size $d_{50}$ was 160 nm. The pH was 6.2 and the glass transition temperature, $T_g$, was 1° C.

EXAMPLE 2

Dispersion D2

A polymerization vessel was charged with 300 g of water, 37 g of a 33% by weight polymer seed ($d_{50}$ 30 nm), 1.8 g of terpinolene, and 10% of the initiator solution (as in example 1), and this initial charge was heated to 85° C.

Then, beginning simultaneously and by way of two separate feeds, a first monomer emulsion (feed stream 1) was added to the polymerization vessel over the course of 1 hour and the remainder of the initiator solution was added to the polymerization vessel over the course of 4 hours, during which the temperature was maintained. Directly after the end of feed stream 1, feed stream 2 was added to the polymerization reactor over the course of 3.5 hours. 4 hours after the beginning of feed stream 1, 30 g of butadiene were added to the reaction vessel over the course of 5 minutes. After the end of the addition of monomer, the mixture was cooled to 70° C. and then, beginning simultaneously, an aqueous solution of 4 g of tert-butyl hydroperoxide in 70 g of water, and a solution of 2.5 g of acetone and 7 g of a 40% strength by weight aqueous sodium disulfite solution in 67 g of water were added over the course of 2 hours, during which the temperature was maintained. Then 60 g of a 25% strength by weight aqueous sodium hydroxide solution were added and the batch was cooled to room temperature.

Feed Stream 1:

| 216.0 g | deionized water |
| 5.3 g | sodium lauryl sulfate solution (28% by weight in water) |
| 3.3 g | n-dodecyl mercaptan |
| 2.0 g | terpinolene |
| 177.8 g | styrene |
| 140.0 g | butadiene |
| 10.0 g | acrylic acid |

Feed Stream 2:

| 754.0 g | deionized water |
| 18.7 g | sodium lauryl sulfate solution (28% by weight in water) |
| 11.7 g | n-dodecyl mercaptan |
| 622.2 g | styrene |
| 490.0 g | butadiene |
| 35.0 g | acrylic acid |

Initiator Solution:

| 15 g | sodium peroxide sulfate in 210 g water |

The resulting polymer dispersion had a pH of 6.2 and a solids content of about 50% by weight. The light transmittance was found to be 48%. The weight-average particle size $d_{50}$ was 160 nm. The polymer had a glass transition temperature of about 1° C.

COMPARATIVE EXAMPLE 1

Dispersion C1

The polymerization was conducted as in example 1 except that neither the initial charge nor the monomer feed contained terpinolene. All of the other process parameters were retained.

The resulting polymer dispersion had a pH of 6.2 and a solids content of about 50% by weight. The light transmittance was found to be 48%. The weight-average particle size $d_{50}$ was 160 nm. The polymer had a glass transition temperature of about 1° C.

COMPARATIVE EXAMPLE 2

Dispersion C2

The polymerization was conducted as in example 1 except that all of the terpinolene (3.8 g) was in the monomer feed stream.

The resulting polymer dispersion had a pH of 6.2 and a solids content of about 50% by weight. The light transmittance was found to be 48%. The weight-average particle size $d_{50}$ was 160 nm. The polymer had a glass transition temperature of about 1° C.

The residual volatiles in dispersions D1, D2, C1, and C2 prior to physical deodorization are indicated in table 1.

TABLE 1

|  | Dispersion | | | |
| --- | --- | --- | --- | --- |
|  | D1 | D2 | C1 | C2 |
| Butadiene [ppm] | 110 | 190 | 100 | 320 |
| Styrene [ppm] | 800 | 700 | 370 | 3700 |
| 4-PCH [ppm] | 50 | 40 | 30 | 80 |
| VCH [ppm] | 130 | 120 | 100 | 290 |

4-PCH = 4-Phenylcyclohexane
VCH = Vinylcyclohexane

II Performance Testing

1. Formulation for the Colored Coating Slip

```
64 parts by weight water
70 parts by weight calcium carbonate
30 parts by weight kaolin
0.4 part by weight sodium polyacrylate
0.05 part by weight sodium hydroxide (as a 25% strength by
    weight solution)
0.5 part by weight carboxymethylcellulose
20 parts by weight polymer dispersion (50% by weight),
    corresponding to 10 g of polymer.
```

The solids content of the slip was 60%.

2. Preparation and Testing of a Coated Paper

The base paper used was a chemical coating base paper having a basis weight of 70 g/m². The paper coating composition was applied at 10 g/m² to one side on a laboratory coating machine. It was dried using an IR lamp. Before the performance tests, the papers were passed four times through a laboratory calender (one roll pair, linear pressure: 2000 N/cm).

Dry Pick Resistance

Strips measuring 33×3 cm were cut lengthwise from the papers under test, and these strips were stored for 15 hours at 27° C. at a relative humidity of 50% in a conditioning chamber.

The strips were subsequently printed in a printing unit (IGT printability test AC2/AIC2) using a standard ink (printing ink 3808 from Lorilleux-Lefranc).

The test strips were passed through the printing unit at a continuously increasing speed (maximum speed 200 cm/s). The speed in cm/s at which 10 tears from the paper coating composition (picks) occurred after the beginning of printing is reported as a measure of the dry pick resistance.

Offset Test:

Paper:

Samples measuring 240×46 mm are cut lengthwise from the papers under test.

Test Procedure:

An appropriate quantity of the printing ink is applied to the inking roller, which is left to run for 1 minute. Thereafter, a printing plate is inserted and inked for 30 seconds.

The printing speed is 1 m/s. A strip of paper is brought back to the starting position on a print sample support with the printed paper strip. After a specified period, the printing process is started again without changing the printing plate. This process is repeated a number of times.

After each pass, the picking on the printed side of the paper strip is assessed visually. The number of passes until picking first occurs is reported. In the case of very pronounced picking, the last pass is stated only as half (e.g., severe picking after the 3rd pass is reported as 2.5).

Colored coating slip F1 contains dispersion D1. Colored coating slip F2 contains dispersion D2, colored coating slip CF1 contains C1.

TABLE 2

| Slip | Binder | Dry pick resistance [cm/s] | Offset test |
| --- | --- | --- | --- |
| F1 | D1 | 88 | 5 |
| F2 | D2 | 84 | 5 |
| CF1 | C1 | 70 | 4 |

The data show that by using terpinolene in combination with alkyl mercaptans it is possible to enhance the performance properties. A further improvement is only found when the majority of the terpinolene is in the initial charge.

We claim:

1. A process for preparing an aqueous styrene-butadiene polymer dispersion by free-radical aqueous emulsion polymerization of a monomer mixture comprising
   styrene,
   butadiene, and optionally
   up to 30% by weight, based on 100% by weight of monomers, of ethylenically
   unsaturated comonomers other than styrene and butadiene;
   said process comprising:
   polymerizing the monomer mixture in a polymerization vessel by a monomer feed
   technique in the presence of a regulator system comprising, based on 100% by weight of monomers,
   from 0.02 to 0.5% by weight of at least one hydrocarbon having from 6 to 20 carbon atoms, selected from compounds which on abstraction of a hydrogen atom form a pentadienyl radical or 1-phenylallyl radical, and
   from 0.3 to 2% by weight of an organic compound containing at least one SH group
   wherein at least 30% of the hydrocarbon is included in the initial charge to the polymerization vessel; and
   wherein at least 90% of the total monomer mixture is metered into the polymerization reaction under polymerization conditions.

2. A process as claimed in claim 1, wherein the organic compound is supplied to the reaction vessel during the course of the polymerization.

3. A process as claimed claim 1, wherein the organic compound is selected from $C_4$-$C_{18}$ alkyl mercaptans.

4. A process as claimed in claim 1, wherein the hydrocarbon is selected from terpinolene and γ-terpinene.

5. A process for preparing an aqueous styrene-butadiene polymer dispersion by free-radical aqueous emulsion polymerization of a monomer mixture comprising styrene, butadiene, and optionally up to 30% by weight, based on 100% by weight of monomers, of ethylenically
   unsaturated comonomers other than styrene and butadiene;
   said process comprising:
   polymerizing the monomer mixture in a polymerization vessel by a monomer feed technique in the presence of a regulator system comprising, based on 100% by weight of monomers,
   from 0.02 to 0.50% by weight of at least one hydrocarbon having from 6 to 20 carbon atoms, selected from compounds which on abstraction of a hydrogen atom form a pentadienyl radical or 1-phenylallyl radical, and α-methylstyrene dimer, and from 0.3 to 20% by weight of an organic compound containing at least one SH group wherein at least 30% of the hydrocarbon is included in the initial charge to the polymerization vessel; and wherein at least 80% of the total monomer mixture is metered into the polymerization reaction under polymerization conditions, wherein at a point in time when at least 70% of the monomers to be polymerized have been supplied to the polymerization reaction the concentration of butadiene in the monomer feed is raised for a period of at least 1% of the total feed duration by at least 10% by weight, based on monomers in the feed.

6. A process as claimed in claim 5, wherein the concentration of butadiene in the monomer feed in this period is raised to at least 50% by weight.

7. A process as claimed in claim 5, wherein a monomer mixture comprising styrene, butadiene, and, if optionally, monomers M3 is supplied to the polymerization reaction as monomer feed Mf1 and, when at least 70% of the monomer feed Mf1 have been supplied to the polymerization reaction, from 0.5 to 20% by weight of butadiene, based on the total amount of the total butadiene to be polymerized, is then supplied to the polymerization reaction as feed Mf2 in parallel with the monomer feed Mf1.

8. A process as claimed in claim 7, wherein the entire feed Mf2 is supplied within a time interval which amounts to from 1 to 20% of the duration of feed Mf1.

9. A process as claimed in claim 1, wherein the polymerization is conducted in the presence of from 0.1 to 10% by weight of at least one seed latex.

10. A process as claimed in claim 1, wherein the monomers other than styrene and butadiene are selected from monoethylenically unsaturated monocarboxylic and dicarboxylic acids having from 3 to 10 carbon atoms, their amides, their $C_2$-$C_4$ hydroxyalkyl esters, their N-(hydroxy-$C_1$-$C_4$-alkyl)amides, and ethylenically unsaturated nitriles.

11. A process as claimed in claim 1, wherein the monomer mixture to be polymerized comprises:
from 40 to 70% by weight of styrene,
from 30 to 59% by weight of butadiene, and
from 1 to 10% of an ethylenically unsaturated monocarboxylic or dicarboxylic acid.

12. A process as claimed in claim 1, wherein the monomer mixture to be polymerized comprises:
from 30% to 65% by weight of styrene,
from 30 to 59% by weight of butadiene,
from 5 to 20% by weight of acrylonitrile and/or methacrylonitrile, and from 1 to 10% by weight of ethylenically unsaturated monocarboxylic or dicarboxylic acid.

13. A method for preparing a colored paper coating slip, which comprises:
adding an aqueous polymer dispersion obtained from the process as claimed in claim 1 to an aqueous suspension comprising at least one inorganic or organic pigment, and customary auxiliaries,
wherein the amount of polymer which is added as an aqueous polymer dispersion being from 5 to 20 parts by weight and the amount of customary auxiliaries being from 0.1 to 5 parts by weight, based in each case on 100 parts by weight of the pigment.

14. A method for preparing a colored paper coating slip, which comprises:
dispersing the polymer obtained from the process as claimed in claim 1 in an aqueous solution to obtain an aqueous polymer dispersion and
adding from 5 to 20 parts by weight of the aqueous polymer dispersion to an aqueous suspension comprising
at least one inorganic or organic pigment, and
from 0.1 to 5 parts by weight of customary auxiliaries, based in each case on 100 parts by weight of pigment.

15. A process as claimed in claim 1, wherein the amount of hydrocarbon is from 0.05 to 0.40% by weight, based on 100% by weight of monomers.

16. A process as claimed in claim 2, wherein the amount of hydrocarbon is from 0.05 to 0.4% a by weight, based on 100% by weight of monomers.

17. A process as claimed in claim 1, wherein 100% of the total monomer mixture is metered into the polymerization reaction under polymerization conditions.

18. A process as claimed in claim 1, wherein the hydrocarbon is terpinolene.

* * * * *